Dec. 8, 1925.
T. E. OGRAM
1,564,614
SIGNAL FOR MOTOR VEHICLES
Filed March 31, 1924    2 Sheets-Sheet 1
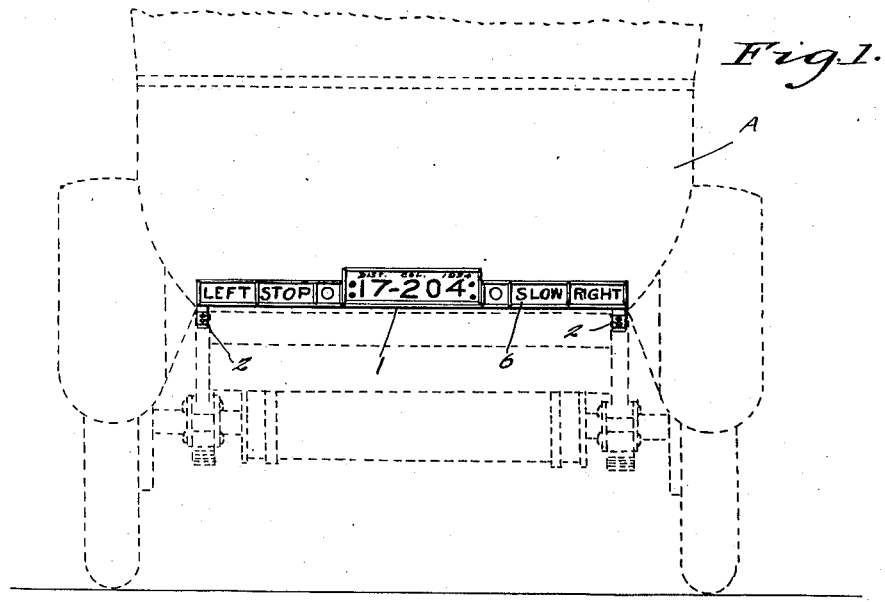
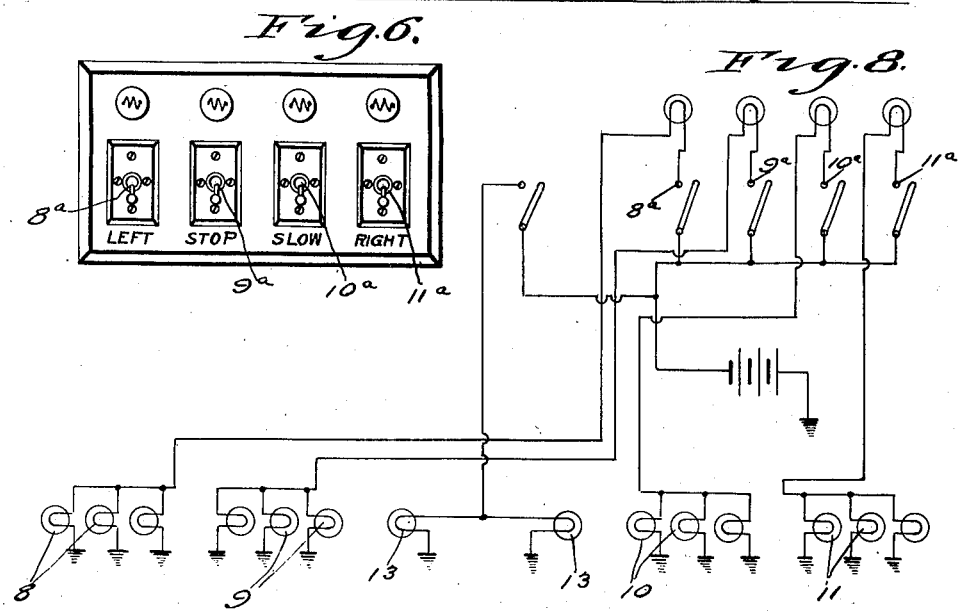
Inventor
Thomas E. Ogram
By Spear, Middleton, Donaldson & Hall
Attorney Dec. 8, 1925.                                            1,564,614
T. E. OGRAM
SIGNAL FOR MOTOR VEHICLES
Filed March 31, 1924        2 Sheets-Sheet 2
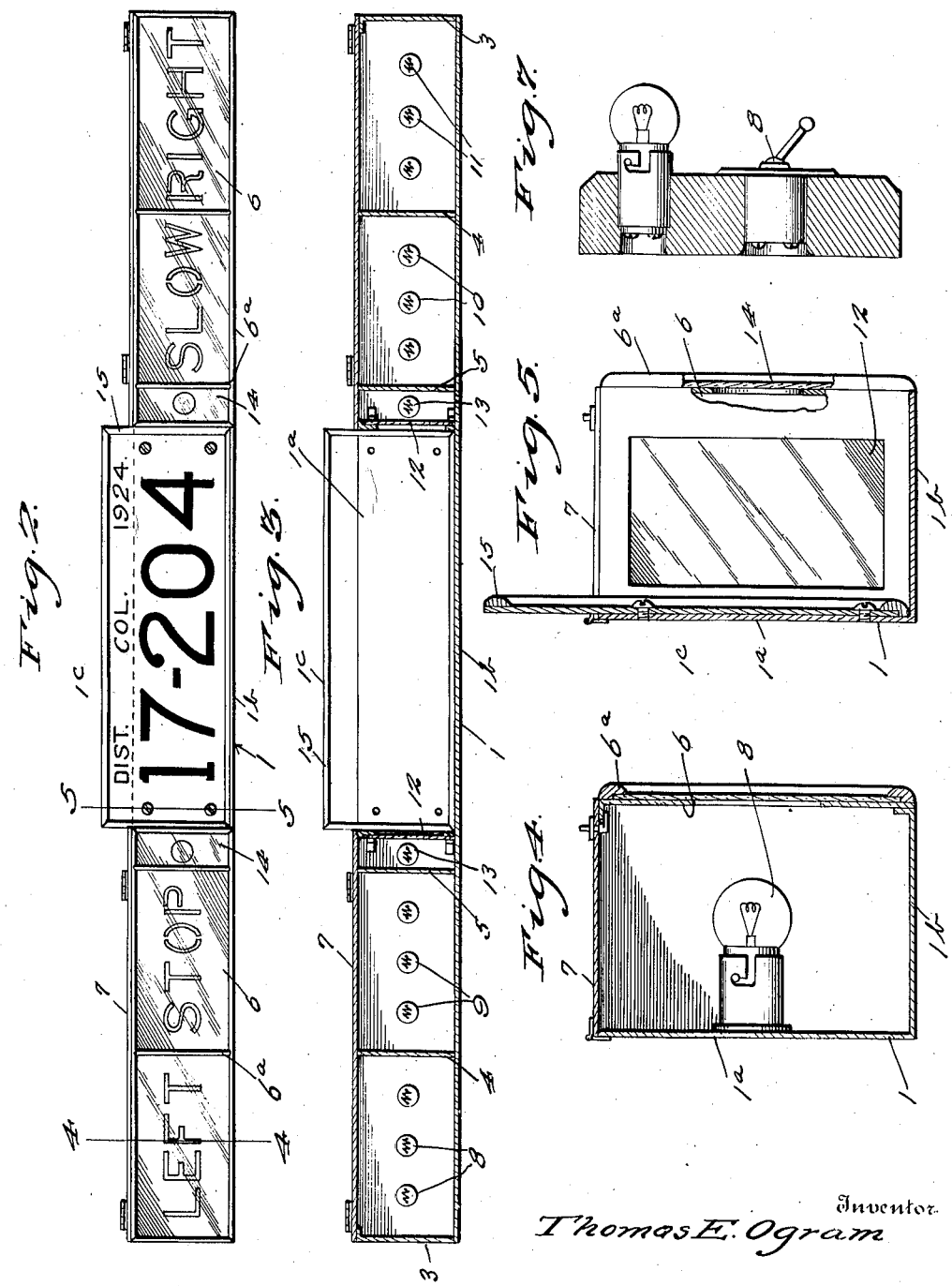

Patented Dec. 8, 1925.

1,564,614

UNITED STATES PATENT OFFICE.

THOMAS E. OGRAM, OF WASHINGTON, DISTRICT OF COLUMBIA.

SIGNAL FOR MOTOR VEHICLES.

Application filed March 31, 1924. Serial No. 703,228.

*To all whom it may concern:*

Be it known that I, THOMAS E. OGRAM, a citizen of the United States, and resident of Washington, in the District of Columbia, have invented certain new and useful Improvements in Signals for Motor Vehicles, of which the following is a specification.

My present invention relates to improvements in signal devices for motor vehicles and aims to provide signal means to be placed on the rear end of a motor vehicle which will give to a following vehicle full information as to whether the preceding driver is going to make a left or right hand turn, slow, or stop, and in which liability of failure of the signal means to operate will be reduced to a minimum.

The invention further aims to provide a signal device which may be economically manufactured and readily applied to any type of motor vehicle, and in which the signals will all be displayed in a straight line with the left turn sign on the left side of the vehicle, and the right turn sign on the right, and with means for conveniently holding the license number plate in the same line so that the person behind the car will have all data of the car ahead in convenient range of vision.

With these and other objects in view, the invention includes the novel features of construction and arrangement and combination of parts hereinafter described and defined by the appended claim.

An embodiment of my invention is illustrated in the accompanying drawings, in which:—

Figure 1 is an elevation showing my improved signal in place on the rear end of a motor vehicle, the latter being indicated by dotted lines.

Fig. 2 is a similar view of the signal box or casing, shown detached and on a larger scale.

Fig. 3 is a longitudinal vertical section.

Fig. 4 is a section on line 4—4 of Fig. 2.

Fig. 5 is a section on line 5—5 of Fig. 2.

Fig. 6 is a detail view of a convenient form of control switch mechanism.

Fig. 7 is a sectional detail of same, and

Fig. 8 is a diagrammatic view illustrating a convenient method of wiring.

Referring by reference characters to these drawings, I have shown conventionally and in outline, at A the rear end of a motor vehicle with my improved signal device in place thereon. This comprises a supporting member or angle bar 1 of substantially L-shape in cross section, providing a back wall member $1^a$ and a horizontal rearwardly projecting bottom wall $1^b$, said bar being formed of sheet metal of the requisite strength and having connected therewith means, such as brackets 2, for connecting it to the body or frame of the vehicle.

The central portion of the bar, designated $1^c$ is reserved for the reception of the license number plate, as hereinafter more fully described, while the portions projecting therefrom carry or form parts of the lamp signal boxes, there being two on each side. These are formed by the end and partition walls 3, 4 and 5 respectively, the rear walls 6, and the top walls 7, all of these walls, as well as the walls $1^a$ and $1^b$ being of apaque material. The said walls are made of sheet metal and the end, partition and back walls may be united to the walls $1^a$ and $1^b$ in any suitable manner, as by welding, crimping, or the like, to form the signal boxes.

One of the walls, conveniently the top wall 7, is formed in the shape of a removable or hinged cover to form a closure for, and permit access to the lamp boxes for the purpose of inserting and replacing the light bulbs.

The rear walls 6 have cut therein, in stencil fashion, letters forming the desired words, such words as shown, reading from left to right being "Left", "Stop", "Go", "Slo" (either or both) and "Right". Said back walls are provided with guides $6^a$ for holding transparent material such as celluloid, colored to give the desired color effect to the rays of light emitted through the stencil openings. The guides $6^a$ may be secured to the part 6 in any desired manner, such as by screws (not shown). Within each box is located a plurality of incandescent lamp bulbs, those in the "Left" box being designated 8, in the "Stop" box 9, in the "Slo" box 10, and in the "Right" box 11. Each group of lamps is electrically connected with a switch $8^a$, $9^a$, $10^a$, $11^a$ located on the dash in convenient reach of the driver and in a row, and in the same order and approximately designated, and associated with each switch or circuit closer is a trouble lamp, the wiring being such that as long as any one of the lamps in any one box will light on closing the switch, the trouble light will be visible, but should all the lights in any one box fail to light (through breakage of filaments for example) the driver would be notified by failure of the trouble lamp to be lighted. By providing a plurality of lamps in each box, danger from failure of the signal to work is reduced to a minimum.

Each inner end wall (designated 12) is formed of plain transparent material such as glass, and forms with partition 5 a small lamp box or compartment containing a bulb 13. The rear walls of these lamp boxes or compartments are made of, or provided with red glass panes 14. These bulbs 13 are connected with the battery by a circuit separate and distinct from the circuits of the other lights and controlled by a suitable switch so that they will be lighted continuously at night.

By this arrangement the bulbs 13 through the transparent end walls 12 throw light on the number plate from both ends, and through the red panes 14, display the rear red light required by law at night. By providing a light at each end, I secure a better illumination of the number plate and also guard against failure of light, as should one bulb cease to work, the other will furnish light enough to comply with the law until repair can be made.

Guides 15 may be provided with slots or openings to enable the license plate to be bolted directly to the back plate.

Having thus described my invention, what I claim is:—

In combination, an elongated bar of substantially L-shape in cross section, means for securing a license plate number to the central portion of the back wall of said bar, and front, top and partition walls carried by said L-shaped bar and forming a plurality of aligned compartments on each side of said license plate, the compartments adjacent the number plate having red translucent rear portions, and clear transparent portions facing the number plate space, the remaining compartments having their rear walls provided with colored light transmitting portions, and illuminating means in all of said compartments.

In testimony whereof, I affix my signature.

THOMAS E. OGRAM.